United States Patent
Larsen et al.

(10) Patent No.: US 10,260,658 B2
(45) Date of Patent: Apr. 16, 2019

(54) UNDERWATER PIPE ASSEMBLY AND METHOD FOR ASSEMBLING UNDERWATER PIPES

(71) Applicants: Jan Larsen, Nicosia (CY); Chen-Shan Kung, Taipei (TW); Yuan-Jui Lu, Taipei (TW)

(72) Inventors: Jan Larsen, Nicosia (CY); Chen-Shan Kung, Taipei (TW); Yuan-Jui Lu, Taipei (TW)

( * ) Notice: Subject to any disclaimer, the term of this patent is extended or adjusted under 35 U.S.C. 154(b) by 359 days.

(21) Appl. No.: 15/181,607

(22) Filed: Jun. 14, 2016

(65) Prior Publication Data

US 2016/0377214 A1 Dec. 29, 2016

(30) Foreign Application Priority Data

Jun. 24, 2015 (TW) .............................. 104120327 A

(51) Int. Cl.
*F16L 1/26* (2006.01)
*B29C 65/34* (2006.01)
(Continued)

(52) U.S. Cl.
CPC ............ *F16L 1/26* (2013.01); *B29C 65/3424* (2013.01); *B29C 65/3432* (2013.01);
(Continued)

(58) Field of Classification Search
CPC . F16L 13/147; F16L 13/0272; F16L 13/0227; F16L 47/03; F16L 47/24;
(Continued)

(56) References Cited

U.S. PATENT DOCUMENTS

| 4,718,698 A | 1/1988 | Hill |
| 4,842,305 A | 6/1989 | Kistenich et al. |

(Continued)

FOREIGN PATENT DOCUMENTS

| CN | 1959176 A | 5/2007 |
| JP | H05318596 A | 12/1993 |

(Continued)

OTHER PUBLICATIONS

TW104120327 Taiwan Search Report dated Apr. 14, 2016 (2 pages).

(Continued)

*Primary Examiner* — Greg Binda
*Assistant Examiner* — Zachary T Dragicevich
(74) *Attorney, Agent, or Firm* — Michael Best & Friedrich LLP

(57) ABSTRACT

An underwater pipe assembly includes first and second pipes each of which has opposite inner and outer circumferential surfaces and an annular end face. An inner coil surrounds the inner circumferential surfaces of the first and second pipes at a junction therebetween. An annular inner cover layer covers the inner coil. An outer coil is sleeved on the outer circumferential surfaces of the first and second pipes at a position corresponding to the inner coil. An annular outer cover layer covers the outer coil. When the inner and outer coils are energized, the end faces of the first and second pipes are melted to fuse together the pipes, and the inner and outer cover layers are melted to radially fuse with the pipes.

4 Claims, 6 Drawing Sheets

(51) Int. Cl.
*F16L 47/03* (2006.01)
*B29C 65/48* (2006.01)
*B29C 65/50* (2006.01)
*B29C 65/00* (2006.01)
*B29C 65/36* (2006.01)

(52) U.S. Cl.
CPC ...... *B29C 65/3476* (2013.01); *B29C 65/4815* (2013.01); *B29C 65/505* (2013.01); *B29C 65/5042* (2013.01); *B29C 66/1142* (2013.01); *B29C 66/5221* (2013.01); *B29C 66/634* (2013.01); *B29C 66/71* (2013.01); *B29C 66/73921* (2013.01); *F16L 47/03* (2013.01); *B29C 65/3624* (2013.01); *B29C 65/3632* (2013.01); *B29C 65/3676* (2013.01)

(58) Field of Classification Search
CPC .... F16L 1/26; B29C 65/3424; B29C 65/3432; B29C 65/00
USPC .. 285/21.1, 21.2, 288.5, 293.1, 222.4, 222.5
See application file for complete search history.

(56) References Cited

U.S. PATENT DOCUMENTS

| | | | | |
|---|---|---|---|---|
| 4,906,313 | A | * | 3/1990 | Hill ............... F16L 47/03 285/21.2 X |
| 5,125,690 | A | * | 6/1992 | Taylor ............ F16L 47/03 285/21.2 X |
| 5,820,720 | A | * | 10/1998 | Campbell ............ 285/21.2 X |
| 2016/0161039 | A1 | * | 6/2016 | Barnes ............ B29C 65/3432 |

FOREIGN PATENT DOCUMENTS

| | | |
|---|---|---|
| WO | 8002124 A1 | 10/1980 |
| WO | 9955120 A1 | 10/1999 |
| WO | 0010796 A1 | 3/2000 |

OTHER PUBLICATIONS

Search Report and Written Opinion from the Intellectual Property Office of Singapore for Application No. SI10201604540Q dated Dec. 5, 2016 (6 pages).

* cited by examiner

UNDERWATER PIPE ASSEMBLY AND METHOD FOR ASSEMBLING UNDERWATER PIPES

CROSS REFERENCE TO RELATED APPLICATION

This application claims priority of Taiwanese Patent Application Number 104120327, filed on Jun. 24, 2015.

FIELD

The disclosure relates to a pipe assembly, more particularly to an underwater pipe assembly and method for assembling the underwater pipes.

BACKGROUND

Referring to FIG. 1, an existing large-diameter underwater pipe for used in pumping seawater is made into a plurality of pipes 1 using a PE material. Two adjacent pipes 1 are welded at their corresponding ends using a welding equipment (not shown) to obtain the desired length. The pipes 1 are pressed toward each other along an axial direction so as to be welded.

The structure of an existing welding equipment is rather complicated, and a welded junction of the two pipes 1 has an uneven shape, so that turbulence and resistance are prone to occur during pumping of the seawater. Furthermore, the structural strength of the welded junction of the two adjacent pipes 1 is insufficient, so that it is susceptible to torque and pressure, thereby generating breakage.

SUMMARY

Therefore, an object of the present disclosure is to provide an underwater pipe assembly that can alleviate at least one of the drawbacks of the prior art.

Another object of the disclosure is to provide a method for assembling underwater pipes.

According to one aspect of the disclosure, an underwater pipe assembly includes first and second pipes, a coupling unit and a clamping unit. The first pipe is made of a plastic material, extends along a longitudinal axis, and has an inner circumferential surface surrounding the longitudinal axis, an outer circumferential surface opposite to the inner circumferential surface, and an annular end face between the inner and outer circumferential surfaces. The second pipe is made of a plastic material, abuts against the first pipe along the longitudinal axis, and has an inner circumferential surface surrounding the longitudinal axis, an outer circumferential surface opposite to the inner circumferential surface of the second pipe, and an annular end face between the inner and outer circumferential surfaces of the second pipe. The annular end faces of the first and second pipes abut against each other. The coupling unit includes an inner coil surrounding the inner circumferential surfaces of the first and second pipes at a junction therebetween, an annular inner cover layer covering the inner coil, an outer coil sleeved on the outer circumferential surfaces of the first and second pipes at a position corresponding to the inner coil, and an annular outer cover layer covering the outer coil. Each of the inner and outer coils has a first end portion located on one side of the junction of the first and second pipes, and a second end portion located on the other side of the junction of the first and second pipes and opposite to the first end portion. When the inner and outer coils are energized, the annular end faces of the first and second pipes are melted to fuse together the first and second pipes along the longitudinal axis, and the annular inner and outer cover layers are melted to fuse with the first and second pipes.

According to another aspect of the disclosure, a method for assembling underwater pipes includes the steps of: (A) preparing first and second pipes, a coupling unit and a clamping unit, each of the first and second pipes being made of a plastic material and extending along a longitudinal axis, each of the first and second pipes having an inner circumferential surface surrounding the longitudinal axis, an outer circumferential surface opposite to the inner circumferential surface, and an annular end face between the inner and outer circumferential surfaces, the coupling unit including inner and outer coils and annular inner and outer cover layers; (B) abutting the annular end faces of the first and second pipes against each other, disposing the inner coil on the inner circumferential surfaces of the first and second pipes at a junction therebetween, and covering the inner coil with the annular inner cover layer; (C) sleeving the outer coil on the outer circumferential surfaces of the first and second pipes at a position corresponding to the inner coil, and covering the outer coil with the annular outer cover layer; (D) clamping tightly the first and second pipes and the coupling unit using the clamping unit; (E) energizing the inner and outer coils so as to generate heat which melts the annular end faces of the first and second pipes to fuse together the first and second pipes along the longitudinal axis and which melts the annular inner and outer cover layers to fuse with the first and second pipes; and (F) removing the clamping unit from the first and second pipes.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
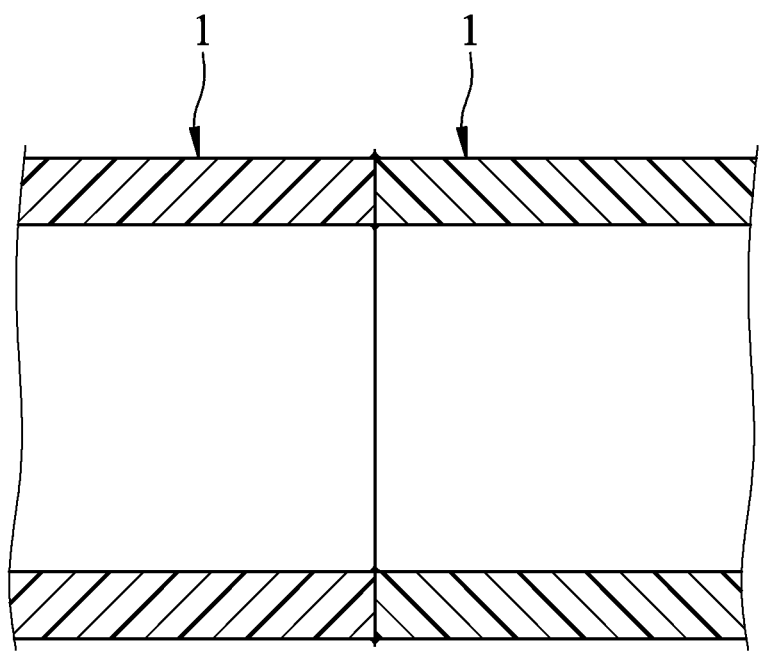
FIG. 1 is a fragmentary sectional view for illustrating how two underwater pipes are connected in a conventional manner.
Figure 2:
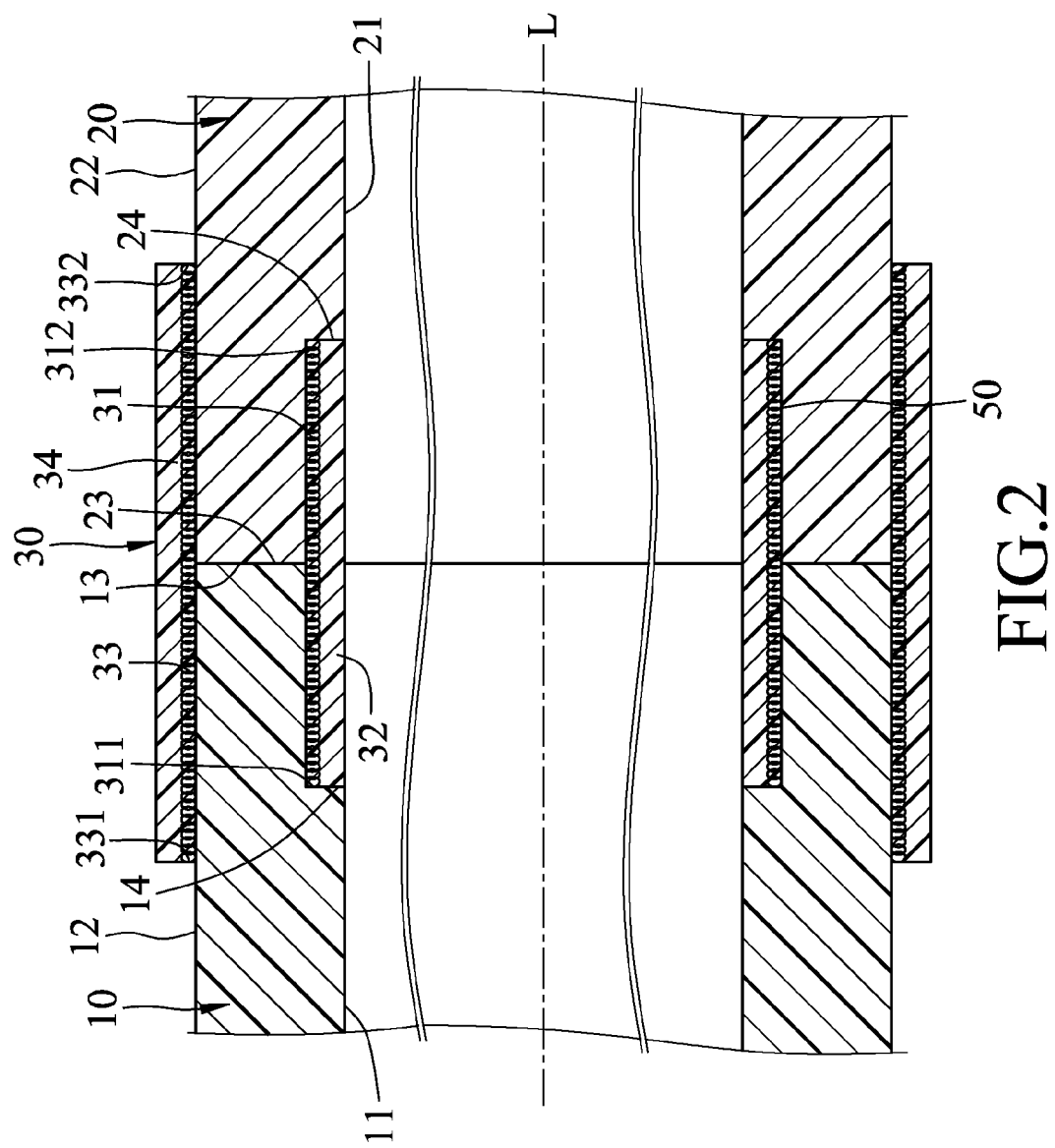
FIG. 2 is a fragmentary assembled sectional view of an underwater pipe assembly according to the embodiment of the present disclosure.
Figure 3:
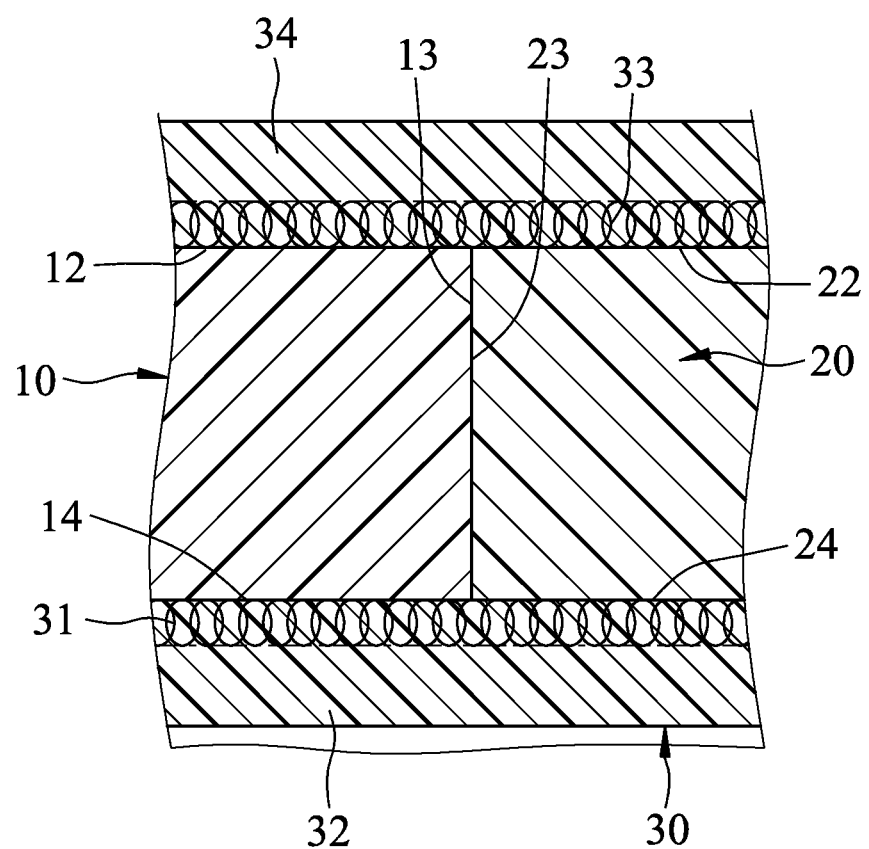
FIG. 3 is a partly enlarged fragmentary sectional view of FIG. 2.

Referring to FIGS. 2 to 6, a large-diameter underwater pipe assembly according to the embodiment of the present disclosure is shown to comprise a first pipe 10, a second pipe 20, a coupling unit 30 and a clamping unit 40.

The first pipe 10 is made of a plastic material, extends along a longitudinal axis (L), and has an inner circumferential surface 11 surrounding the longitudinal axis (L), an outer circumferential surface 12 opposite to the inner circumferential surface 11, and an annular end face 13 between the inner and outer circumferential surfaces 11, 12. The inner circumferential surface 11 has a first annular recess 14 extending inwardly and axially from the end face 13. In this embodiment, the first pipe 10 is made of a polyethylene (PE) material.

The second pipe 20 is made of a plastic material, abuts against the first pipe 10 along the longitudinal axis (L), and has an inner circumferential surface 21 surrounding the longitudinal axis (L), an outer circumferential surface 22 opposite to the inner circumferential surface 21, and an annular end face 23 between the inner and outer circumferential surfaces 21, 22. The inner circumferential surface 21 has a second annular recess 24 extending inwardly and axially from the end face 23. The end faces 13, 23 of the first and second pipes 10, 20 abut against each other. The first and second annular recesses 14, 24 are aligned and communicate with each other along the longitudinal axis (L), and cooperatively form an elongated annular notch 50 that extends from the inner circumferential surface 11 of the first pipe 10 to the inner circumferential surface 21 of the second pipe 20. In this embodiment, the second pipe 20 is also made of a polyethylene (PE) material.

In this embodiment, the coupling unit 30 includes an inner coil 31 disposed in the annular notch 50, an annular inner cover layer 32 disposed in the annular notch 50 and covering the inner coil 31, an annular outer coil 33 sleeved on the outer circumferential surfaces 12, 22 of the first and second pipes 10, 20 at a junction therebetween and corresponding in position to the inner coil 31, and an annular outer cover layer 34 covering the outer coil 33. In this embodiment, each of the inner and outer coils 31, 33 is made of copper wire, and a length of the outer cover layer 34 along the longitudinal axis (L) is greater than that of the inner cover layer 32 along the longitudinal axis (L). Each of the inner and outer cover layers 32, 34 is made of one of the polyethylene and polypropylene materials. The inner cover layer 32 is flush with the inner circumferential surfaces 11, 21.

The inner coil 31 has a first end portion 311 located in the first annular recess 14, and a second end portion 312 opposite to the first end portion 311 and located in the second annular recess 24. The outer coil 33 has a first end portion 331 located on the outer circumferential surface 12, and a second end portion 332 opposite to the first end portion 331 and located on the outer circumferential surface 22.

Figure 5:
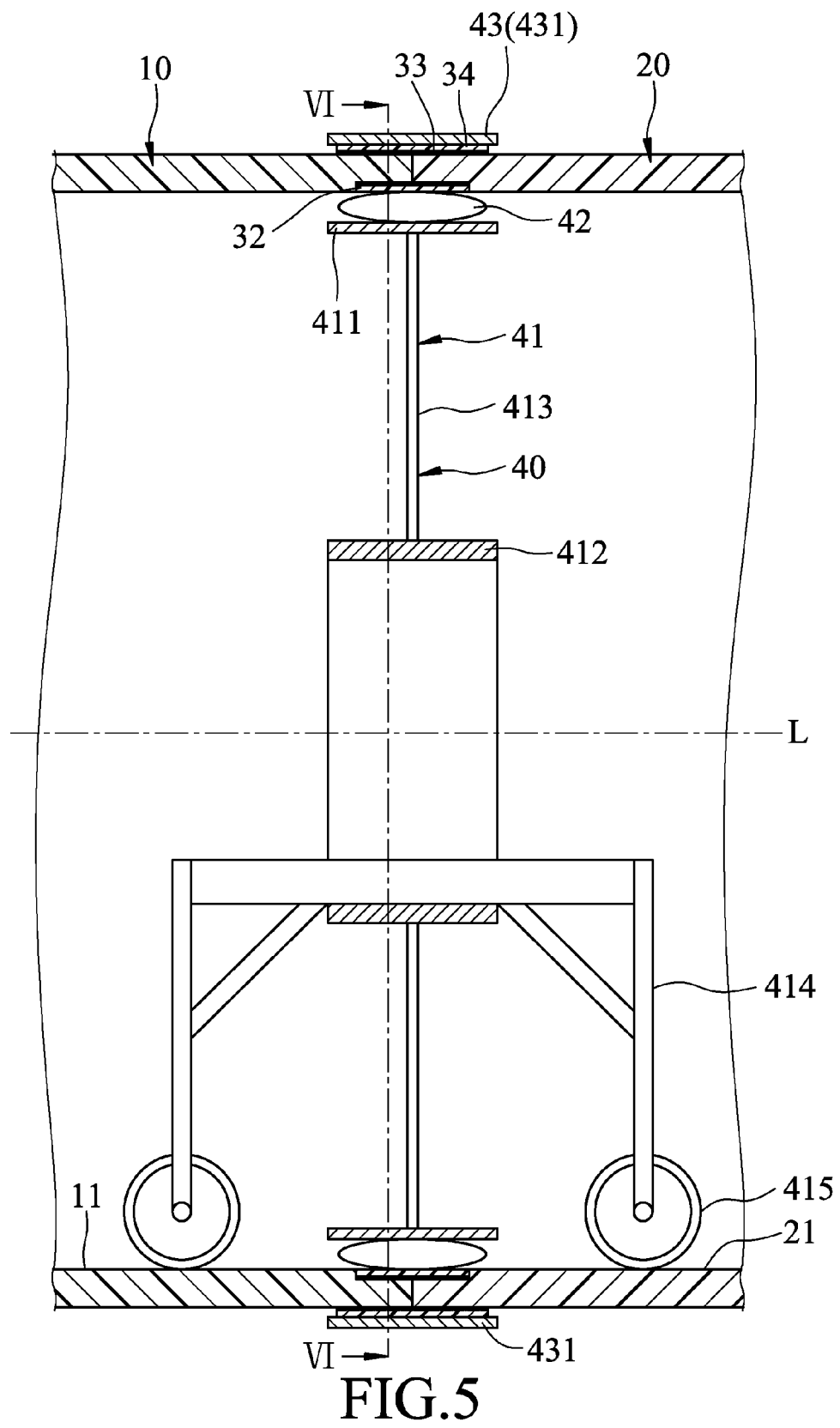
FIG. 5 is an enlarged fragmentary sectional view for illustrating how the first and second pipes are assembled.
Figure 6:
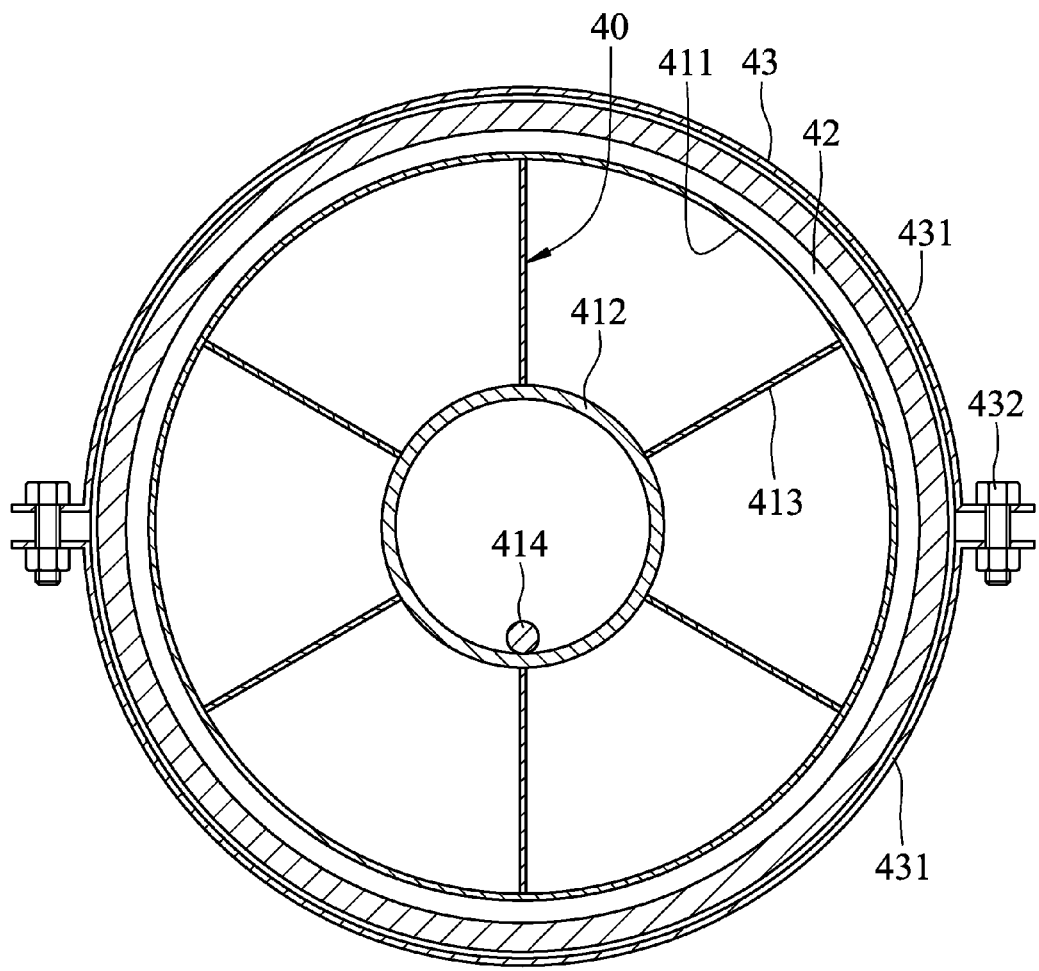
FIG. 6 is a sectional view of the embodiment taken along line VI-VI of FIG. 5.

With reference to FIGS. 5 and 6, the clamping unit 40 is removably mounted on the first and second pipes 10, 20 at the junction therebetween, and includes a support member 41 movably disposed inside the first and second pipes 10, 20, an inflatable ring 42 disposed between the support member 41 and the inner cover layer 32, and a clamping member 43 clamped around the outer cover layer 34. The support member 41 includes a support ring 411 surrounding the longitudinal axis (L), a connecting ring 412 disposed inside the support ring 411, a plurality of angularly spaced-apart spokes 413 connected between the support ring 411 and the connecting ring 412, a cross frame 414 connected to the connecting ring 412, and a plurality of rollers 415 mounted on the cross frame 414 and rollable on the inner circumferential surfaces 11, 21 along the longitudinal axis (L). The inflatable ring 42 is sleeved on the support ring 411. The cross frame 414 is configured as an inverted U-shaped frame. The clamping member 43 includes a pair of semi-circular clamping frames 431 removably coupled to each other through a plurality of bolts 432.

Figure 4:
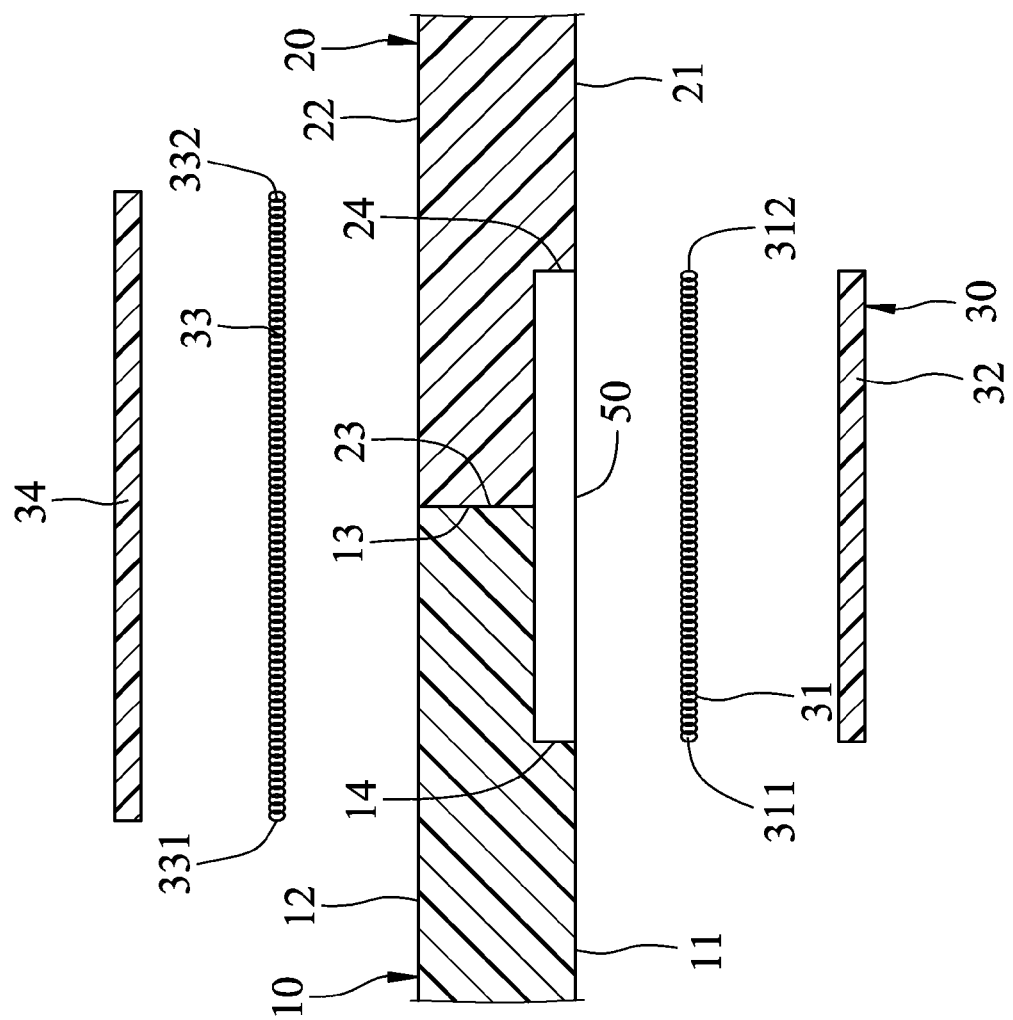
FIG. 4 is an exploded sectional view of FIG. 3.

As shown in FIG. 4, during assembly, the annular end faces 13, 23 of the first and second pipes 10, 20 are first brought to abut against each other, after which the inner coil 31 is disposed in the annular notch 50 and the inner cover layer 32 is also disposed in the annular notch 50 to cover the inner coil 31. Next, the outer coil 33 is sleeved on the outer circumferential surfaces 12, 22 corresponding in position to the inner coil 31, and the outer cover layer 34 is sleeved on the outer coil 33 to cover the same. Afterwards, as shown in FIG. 5, the support member 41 and the inflatable ring 42 are moved along the longitudinal axis (L) to a position corresponding to the inner cover layer 32 through the rollers 415, and the clamping frames 431 of the clamping member 43 are clamped and tightened around the outer cover layer 34.

As shown in FIGS. 5 and 6, the inflatable ring 42 is then inflated so as to expand radially outward so that the first and second pipes 10, 20 and the coupling unit 30 are pressed outward by the support member 41, while the clamping member 43 moves radially inward to generate a clamping effect. Simultaneously, the inner coil 31 and the outer coil 33 are energized to generate heat so as to melt the first pipe 10, the second pipe 20, the inner cover layer 32 and the outer cover layer 34 under the pressure of the clamping unit 40. Specifically, the annular end faces 13, 23 of the first and second pipes 10, 20 are melted to fuse together the first and second pipes 10, 20 along the longitudinal axis (L), and the inner and outer cover layers 32, 34 are melted to radially fuse with the first and second pipes 10, 20 through the inner and outer coils 31, 33. Moreover, through the clearance of the inner coil 31, the inner cover layer 32 can be melted to radially fuse with the inner circumferential surfaces 11, 21 of the first and second pipes 10, 20. The inner coil 31 is completely embedded between the inner cover layer 32 and the first and second pipes 10, 20, so that generation of voids and bubbles can be prevented. By the same token, through the clearance of the outer coil 33, the outer cover layer 34 can be melted to radially fuse with the outer circumferential surfaces 12, 22 of the first and second pipes 10, 20. The outer coil 33 is completely embedded between the outer cover layer 34 and the first and second pipes 10, 20, so that generation of voids and bubbles can be similarly prevented.

Referring again to FIGS. 2 and 3, after the first and second pipes 10, 20 are fused together, the clamping unit 40 is removed from the first and second pipes 10, 20. Because the inner coil 31 is embedded between the inner cover layer 32 and the first and second pipes 10, 20, and because outer coil 33 is embedded between the outer cover layer 34 and the first and second pipes 10, 20, the structural strength of the junction between the first and second pipes 10, 20 is enhanced. Furthermore, because the inner cover layer 32 can be melted to radially fuse with the inner circumferential surfaces 11, 21 of the first and second pipes 10, 20 through the clearance of the inner coil 31, because the outer cover layer 34 can also be melted to radially fuse with the outer circumferential surfaces 12, 22 of the first and second pipes 10, 20 through the clearance of the outer coil 33, and through the use of the coupling unit 30, the structural strength of the junction between the first and second pipes 10, 20 can be further enhanced.

Additionally, with the inner coil 31 and the inner cover layer 32 being disposed in the annular notch 50, and with the inner cover layer 32 being flush with the inner circumferential surfaces 11, 21, pumped water can flow smoothly in the first and second pipes 10, 20 without resistance.

A method for assembling large-diameter underwater pipes according to this disclosure is described with reference to FIGS. 2 to 6, and includes the following steps:

Step 1: preparing the first pipe 10, the second pipe 20, the coupling unit 30 and the clamping unit 40;

Step 2: as shown in FIG. 4, abutting the annular end faces 13, 23 of the first and second pipes 10, 20 against each other, disposing the inner coil 31 in the annular notch 50, and covering the inner coil 31 with the annular inner cover layer 32;

Step 3: sleeving the outer coil 33 on the outer circumferential surfaces 12, 22 of the first and second pipes 10, 20 at a position corresponding to the inner coil 31, and covering the outer coil 33 with the annular outer cover layer 34;

Step 4: disposing the support member 41 inside the first and second pipes 10, 20 and sleeving the inflatable ring 42 around the support ring 411 of the support member 41;

Step 5: moving the support member 41 and the inflatable ring 42 inside the first and second pipes 10, 20 to a position corresponding to the inner cover layer 32 through the rollers 415;

Step 7: clamping and tightening the clamping frames 431 of the clamping member 43 around the outer cover layer 34 through the bolts 432;

Step 8: as shown in FIGS. 5 and 6, inflating the inflatable ring 42 so as to expand radially outward so that the first and second pipes 10, 20 and the coupling unit 30 are pressed outward by the support member 41, while the clamping member 43 moves radially inward to generate a clamping effect;

Step 9: energizing the inner and outer coils 31, 33 so as to generate heat which melts the annular end faces 13, 23 of the first and second pipes 10, 20 to fuse together the first and second pipes 10, 20 along the longitudinal axis (L) and which melts the annular inner and outer cover layers 32, 34 to radially fuse with the first and second pipes 10, 20 through the inner and outer coils 31, 33; and Step 10: removing the clamping unit 40 from the first and second pipes 10, 20.

By using the foregoing steps, the coupling unit 30 and the junction between the first and second pipes 10, 20 can be firmly connected. Hence, the manufacturing process is easy, and the equipments used in the manufacturing process are simple, so that the manufacturing cost associated therewith can be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An underwater pipe assembly comprising:
   a first pipe made of a plastic material, extending along a longitudinal axis, and having an inner circumferential surface surrounding the longitudinal axis, an outer circumferential surface opposite to said inner circumferential surface, and an annular end face between the inner and outer circumferential surfaces;
   a second pipe made of a plastic material, abutting against said first pipe, and having an inner circumferential surface surrounding the longitudinal axis, an outer circumferential surface opposite to said inner circumferential surface of said second pipe, and an annular end face between said inner and outer circumferential surfaces of said second pipe, said annular end faces of said first and second pipes abutting against each other; and
   a coupling unit including an inner coil surrounding said inner circumferential surfaces of said first and second pipes at a junction therebetween, an annular inner cover layer covering said inner coil, an outer coil sleeved on said outer circumferential surfaces of said first and second pipes at a position corresponding to said inner coil, and an annular outer cover layer covering said outer coil, each of said inner and outer coils having a first end portion located on one side of the junction of said first and second pipes, and a second end portion located on the other side of the junction of said first and second pipes and opposite to said first end portion;
   wherein, when said inner and outer coils are energized, said annular end faces of said first and second pipes are melted to fuse together said first and second pipes along the longitudinal axis, and said annular inner and outer cover layers are melted to radially fuse with said first and second pipes, and
   wherein, said inner circumferential surface of said first pipe has a first annular recess extending inwardly and axially from said annular end face of said first pipe, said inner circumferential surface of said second pipe having a second annular recess extending inwardly and axially from said annular end face of said second pipe, said first and second annular recesses communicating with each other along the longitudinal axis and cooperatively forming an annular notch, said inner coil and said annular inner cover layer being disposed in said annular notch, said first end portion of said inner coil being located in said first annular recess, said second end portion of said inner coil being located in said second annular recess, said annular inner cover layer being flush with said inner circumferential surfaces of said first and second pipes.

2. The underwater pipe assembly as claimed in claim 1, wherein a length of said annular outer cover layer along the longitudinal axis is greater than that of said annular inner cover layer along the longitudinal axis.

3. The underwater pipe assembly as claimed in claim 1, wherein each of said first and second pipes is made of a polyethylene material, and each of said annular inner and outer cover layers is made of one of polyethylene and polypropylene materials.

4. An underwater pipe assembly comprising:
   a first pipe made of a plastic material, extending along a longitudinal axis, and having an inner circumferential surface surrounding the longitudinal axis, an outer circumferential surface opposite to said inner circumferential surface, and an annular end face between the inner and outer circumferential surfaces;
   a second pipe made of a plastic material, abutting against said first pipe, and having an inner circumferential surface surrounding the longitudinal axis, an outer circumferential surface opposite to said inner circumferential surface of said second pipe, and an annular end face between said inner and outer circumferential surfaces of said second pipe, said annular end faces of said first and second pipes abutting against each other;

a coupling unit including an inner coil surrounding said inner circumferential surfaces of said first and second pipes at a junction therebetween, an annular inner cover layer covering said inner coil, an outer coil sleeved on said outer circumferential surfaces of said first and second pipes at a position corresponding to said inner coil, and an annular outer cover layer covering said outer coil, each of said inner and outer coils having a first end portion located on one side of the junction of said first and second pipes, and a second end portion located on the other side of the junction of said first and second pipes and opposite to said first end portion;

a clamping unit removably mounted on said first and second pipes at the junction therebetween, said clamping unit including a support member movably disposed inside said first and second pipes, an inflatable ring disposed between said support member and the junction between said first and second pipes, and a clamping member clamped around said annular outer cover layer, said support member including a support ring surrounding the longitudinal axis, a connecting ring disposed inside said support ring, a plurality of angularly spaced-apart spokes connected between said support ring and said connecting ring, a cross frame connected to said connecting ring, and a plurality of rollers mounted on said cross frame and rollable along said inner circumferential surfaces of said first and second pipes;

wherein, when said inner and outer coils are energized, said annular end faces of said first and second pipes are melted to fuse together said first and second pipes along the longitudinal axis, and said annular inner and outer cover layers are melted to radially fuse with said first and second pipes.

* * * * *